May 11, 1937.  J. D. COCHIN  2,080,114
VEHICLE LIFT
Filed March 4, 1935  2 Sheets-Sheet 1
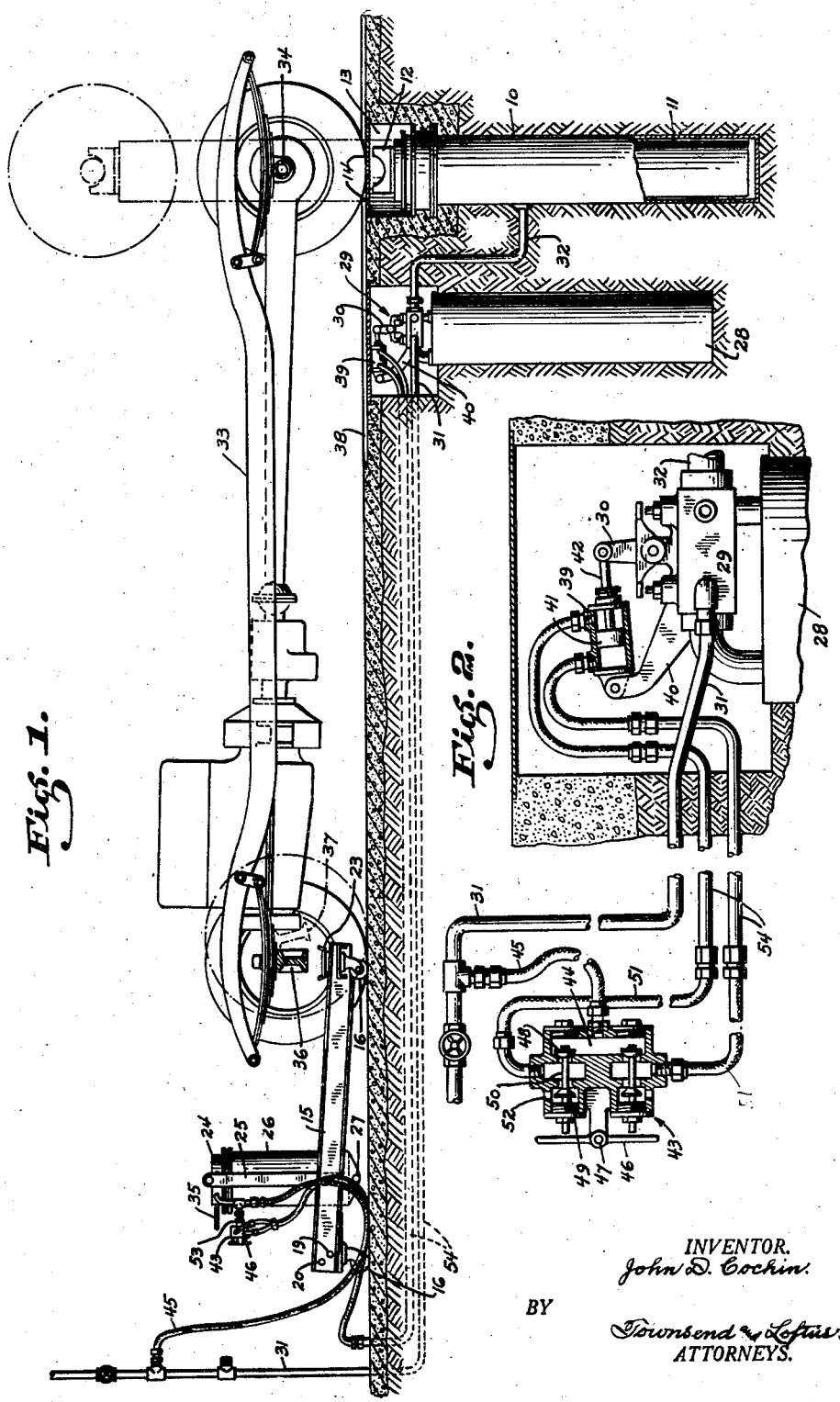
INVENTOR.
John D. Cochin.
BY
Townsend & Loftus.
ATTORNEYS.

May 11, 1937.  J. D. COCHIN  2,080,114
VEHICLE LIFT
Filed March 4, 1935   2 Sheets-Sheet 2
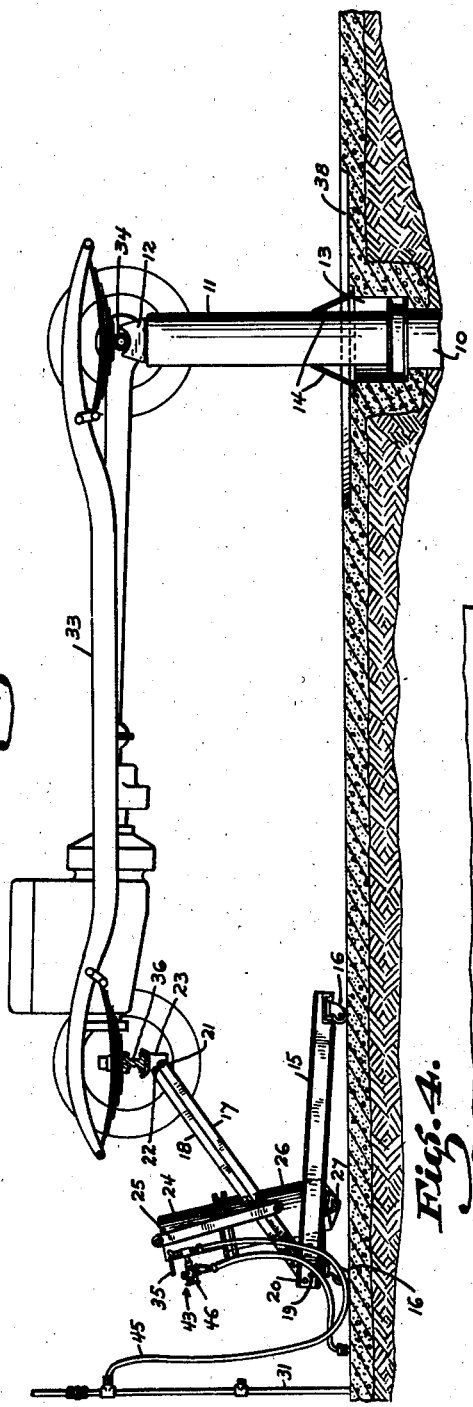
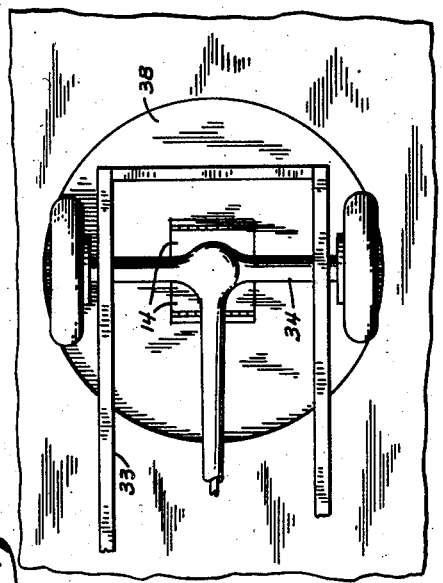
INVENTOR.
John D. Cochin.
BY
Townsend Loftus
ATTORNEYS.

Patented May 11, 1937

2,080,114

UNITED STATES PATENT OFFICE 2,080,114

VEHICLE LIFT

John D. Cochin, San Francisco, Calif.

Application March 4, 1935, Serial No. 9,155

6 Claims. (Cl. 254—2)

This invention relates to vehicle lifts and particularly to lifts of the kind employed for raising a vehicle or a part thereof to an elevation permitting ready inspection, repair, or adjustment of its running gear or other parts ordinarily difficult of access.

The most commonly used vehicle lifts are of the stationary type and comprise a ram projecting beneath the floor level and adapted to be raised by some suitable means, such as fluid under pressure. Ordinarily the head of the ram supports rails or a runway for engagement with the axles or wheels of the vehicle driven over it to raise and support the vehicle in an elevated position. Such rails and runways must be nearly as long as the largest vehicle to be lifted; consequently the floor space occupied by the lift while it is idle as well as while it is in use is relatively great, and for this reason it is oftentimes impossible or impractical to install a lift where there is need for one.

Likewise, a cellar large enough to permit a workman to move about beneath a vehicle or even large enough to receive the entire lift in a position beneath the floor level when it is not in use occupies considerable floor space, and is in many instances too costly or, for other reasons, impractical to install.

A further disadvantage of the usual type of stationary lift is that the rails or runways supporting the vehicle occupy much of the space beneath the vehicle when it is raised and conceal and obstruct many of the parts to be serviced.

It is the object of the present invention to overcome the above and other disadvantages of existing forms of vehicle lifts and to provide a generally improved lift which, without sacrificing any desirable feature of ordinary lifts, may be installed within a relatively small floor area and which, when not in use, will in no way hinder the parking or driving of vehicles over the area that it occupies.

A further object of my invention is to provide a lift that is simple in construction and in operation, and that is highly flexible in its adaptability to many kinds of use, and that will be capable of engaging and raising a vehicle without presenting any unnecessary obstruction in the vicinity of the parts to be serviced.

A still further object is to provide a lift which includes means for facilitating the positioning of a vehicle thereover so that either the front or rear axle of a vehicle approaching the lift from any angle may be easily placed in a position for engagement by the lift.

In carrying my invention into practice, I provide a lifting member of the sub-floor type for engagement with one axle of the vehicle. A lifting member of the portable type is employed for engaging the other axle. Both lift members may be operated by vertically reciprocable fluid-actuated rams, and control means for both members are provided at a common, easily accessible point. The portable lifting member is free for movement to and away from the stationary member to accommodate vehicles of various lengths, and is movable around the stationary member, so that a vehicle may be readily lifted regardless of the angle at which it is positioned. Preferably the portable member will form a support for the commonly located control means referred to. With this arrangement a vehicle may be driven to a position with either its front or rear axle over the stationary member, and the portable lifting member, upon being moved to a position beneath the other axle, may be operated with the stationary member to raise the entire vehicle to any desired height. When the lift is not in use, the axle-engaging element of the stationary lifting member will be received beneath the floor level, and the portable lifting member may be moved aside with the result that the capacity of the floor for parking or driving purposes is not reduced due to the presence of the lift.

One form of my invention is illustrated in the accompanying drawings and described in greater detail in the following specification, wherein further of its objects and advantages are made apparent.

In the drawings—

Fig. 1 is a side elevation of a vehicle lift constructed in accordance with my invention with the floor in which the lift is positioned shown in section to expose the construction of the stationary lifting element;

Fig. 2 is a schematic view of the remote control means for the stationary lifting member with the air valve thereof shown in section;

Fig. 3 is a view similar to Fig. 1, showing both the stationary and portable lifting members in elevated positions; and Fig. 4 is a plan view of the stationary lifting member illustrating the means employed for facilitating the positioning of a vehicle thereover.

Referring more particularly to the drawings, the vehicle lift is illustrated in Fig. 1 as comprising a stationary lifting member and a portable lifting member. The stationary lifting member includes a ram casing 10 disposed beneath the floor level and receiving a vertically reciprocable ram 11. The upper end of the ram 11 is fitted with a vehicle-engaging yoke 12 for engagement with the axle of a vehicle when the ram is raised. When the ram is in its lowermost position, a recess 13 formed in the floor receives the upper end thereof entirely beneath the floor level, and hinged doors 14, as best illustrated in Fig. 3, form a closure for the recess 13. The doors 14 are in the form of trap doors normally assuming a closed position and arranged for engagement by the ram as it is raised to open them and hold them open.

The portable lifting member, as illustrated in Figs. 1 and 2, is of the type described in my copending application entitled "Portable vehicle lift", filed June 13, 1932, Serial Number 616,821, patented Sept. 15, 1936 as Patent No. 2,054,555 and comprises a frame 15 supported for movement upon casters 16. Parallel bars 17 and 18 are pivoted at 19 and 20, respectively, to the frame 15 and at 21 and 22 to a vehicle-engaging member 23. Due to the parallel arrangement of the pivots of the bars 17 and 18, the vehicle-engaging member 23 is always maintained in a level or horizontal position as it is being raised and lowered. The raising and lowering of the bars 17 and 18 are accomplished by means of a ram 24 connected by pivoted links 25 to these bars and carried for vertical reciprocation in a ram-casing 26 pivoted as at 27 with relation to the main frame 15.

I have shown both the stationary and portable lifting members to be of the type that is actuated by oil and air under pressure. An oil reservoir for the stationary member is indicated at 28. A valve, generally indicated at 29, for controlling both oil and air and which may be of the type described in my patent entitled "Valves for lifting devices", Reissue 19,239, is positioned on top of the reservoir 28. This valve includes an operating handle 30 (see Fig. 2) which, upon movement in one direction, will at once open an air port and an oil port, permitting air under pressure which may be led to the valves through a line 31 to enter the reservoir and expel oil therefrom through a pipe 32 and into the ram casing 10. The oil thus forced into the ram casing under air pressure displaces the ram and raises the vehicle positioned thereover.

Fig. 1 illustrates a vehicle chassis 33 positioned with the rear axle 34 thereof in alignment with the stationary lifting member for engagement by the ram thereof. When the vehicle is lifted to the desired height, the lever 30 is released, closing both the oil and the air ports. The oil then contained in the casing 10 and supporting the vehicle in its elevated position is prevented from returning to the reservoir 28 through the pipe 32. When the lever 30 is moved in the opposite direction, an oil port is opened permitting return of the oil to the reservoir and an air port is simultaneously opened permitting exhaust of the air which is displaced upon return of the oil.

A valve of the same type as that shown at 29 is employed for operating the portable lifting member, and is positioned within the head of the ram thereof, having the operating lever extending outwardly as indicated at 35. The ram of the portable lift is hollow and serves as an oil reservoir, as set forth in detail in my co-pending application above referred to.

When it is desired to elevate a vehicle, it is driven to the position of the chassis illustrated in Fig. 1, with one axle positioned over the stationary lifting element. This lifting element is then employed to raise one end of the vehicle to a desired height, as is indicated by dotted lines in Fig. 1. The portable lifting member is then positioned beneath the other axle of the vehicle and operated to raise the same until the vehicle assumes the position of the chassis illustrated at 33 in Fig. 3. It is important that one of the lifting members be portable in a lift of this character, not only to accommodate vehicles of different lengths but to adjust the distance between the lifting members, which varies as one end of the vehicle is lifted. For example, in Fig. 1 the normal position of the front axle of the vehicle before the rear axle is lifted is illustrated at 36; while the position of this axle after the rear wheel has been elevated is illustrated in dotted lines at 37. Due to this horizontal displacement of the front axle which accompanies vertical movement of the rear axle, it is essential that one lifting element be portable in order that it may be properly positioned to engage the vehicle either before or after it has been elevated by the stationary member. It is, however, possible and sometimes desirable to raise both ends of a vehicle at once. To facilitate simultaneous operation of the lifting members, I provide remote control means for the stationary member, which means are fully described hereinafter.

In order to faciliate the positioning of the vehicle over the stationary lifting member, I have provided a depression 38 in the floor, which is circular and concentric with the head of the ram, as illustrated in Fig. 4 of the drawings. The diameter of the depression 38 is just sufficient to receive a pair of wheels spaced a standard distance apart so that when a vehicle is driven over the stationary lifting member, either the front wheels or rear wheels will fall into the depression 38 and regardless of the angle of approach of the vehicle, the driver will be assured that the central portion of the axle between the wheels will be in a position for engagement by the ram when it is raised.

As set forth above, the operating lever 35 for the portable lifting member is carried by the ram thereof and is therefore always in a readily accessible position. In order that the stationary lifting member may be operated from an equally accessible position and, if desired, from the same position, I have provided the remote control mechanism therefor illustrated in Figs. 1 and 2. This mechanism comprises a cylinder 39 supported by a bracket 40 in a position adjacent the valve 29 and having a piston 41 therein connected by a rod 42 with the operating lever 30. Air under pressure is employed for operating the lever 30 through the medium of the piston 41. The air is controlled by a valve 43 illustrated in Fig. 2. The valve 43 comprises a chamber 44 to which air from the main air line 31 is led through a flexible conduit 45. A handle 46 centrally pivoted as at 47 may be depressed in one direction to open an air valve 48, and simultaneously to close an exhaust valve 49, which valves are on a common stem 50. Upon operation of the valve in this direction, air under pressure in the chamber 44 will pass through the valve 48 and a flexible conduit 51 to move the piston 41 in left-hand direction. Upon release of the lever 46, the air pressure in the chamber 44 will close the air valve 48 and open the exhaust valve 49, permitting exhaust of the air through a port 52 and thus permitting the piston 41 to return to its original central position. Operation of the valve lever 46 in the opposite direction will effect a movement of the piston 41 to the right through mechanism identical to that just described.

By supporting the valve 43 on a bracket 53 on the portable lifting member and supplying air thereto by flexible conduits, as illustrated in Fig. 1, the conduits 51 being led to the valve 29 through concealed pipes 54, both the stationary and portable lifting members may be raised or lowered from a common point on the portable lifting member. This arrangement of the controls has proven very convenient as the operator, upon driving the vehicle to a position with one of its axles over the stationary lifting member, which position may be accurately determined without the necessity of his getting out of the vehicle, has merely to roll the portable member to a position beneath the opposite axle and from this point operate the lever 35 and the lever 46 to raise either end or both ends of the vehicle to any desired height. I have described a remote control system actuated by compressed air, but it is, of course, foreseen that other systems, such as electrical or mechanical, may be used; and if desired, the valve 29 of the stationary lifting member may merely be provided with an extension or rod connected to its lever 30 and extending to a position from which it may be conveniently manipulated manually.

While I have illustrated a preferred form of my invention and described the same more or less specifically, I wish it understood that various changes may be resorted to in the construction and arrangement of its several parts within the scope of the appended claims.

Having described my invention, what I claim and desire to secure by Letters Patent, is—

1. A vehicle lift comprising a stationary lifting member disposed beneath the floor level and capable of engaging and lifting one end of a vehicle, a portable lifting member movable over the surface of the floor to engage and lift the other end of the vehicle, means for operating said lifting members independently, control means for the portable member carried by said member, remote control means for the stationary member, and means for supporting said remote control means on the portable member.

2. In a vehicle lift, the combination of a stationary lifting member disposed beneath the floor level, a portable lifting member movable over the surface of the floor, means on each lifting member for controlling its operation independently, and remote control means for the stationary member operable from a point on the movable member.

3. In combination with a vehicle lift including a fluid-actuated ram and a fluid control valve associated therewith, means for actuating said valve from a remote position comprising a cylinder, a piston reciprocable therein and connected with the control valve, means connecting the opposite ends of the cylinder with a source of compressed air, and remotely positioned valve means for admitting air selectively to either end of the cylinder.

4. In a vehicle lift, the combination of a stationary lifting member disposed beneath the floor level, a portable lifting member movable over the surface of the floor, and remote control means for the stationary member operable from a point on the portable member.

5. In a vehicle lift, the combination of a stationary lifting member disposed beneath the floor level, a portable lifting member movable over the surface of the floor, means for controlling the operation of each lifting member independently, and means for securing the control for the stationary lifting member to the portable lifting member.

6. In a vehicle lift, the combination of a stationary lifting member disposed beneath the floor level, a portable lifting member movable over the surface of the floor, and means for controlling independently the operation of the stationary lifting member and the operation of the portable lifting member, the control for the stationary lifting member being portably connected thereto for movement with the portable lifting member.

JOHN D. COCHIN.